United States Patent [19]

McNinch, Jr.

[11] Patent Number: 4,863,221

[45] Date of Patent: Sep. 5, 1989

[54] TANDEM DRIVE AXLE ANTI-LOCK BRAKE SYSTEM

[75] Inventor: Joseph H. McNinch, Jr., Livonia, Mich.

[73] Assignee: Eaton Corporation, Cleveland, Ohio

[21] Appl. No.: 233,402

[22] Filed: Aug. 18, 1988

[51] Int. Cl.[4] .......................... B60T 13/00; B60T 8/58
[52] U.S. Cl. .......................................... 303/94; 303/7;
303/22.1; 303/100; 303/113; 303/118; 303/119;
303/9.62; 303/9.66; 303/98; 188/181 R;
188/181 C; 188/181 T
[58] Field of Search ....................... 303/91, 92, 93, 94,
303/95, 96, 98, 100, 102, 108, 103, 7, 9.62, 9.66,
118, 9.69, 22.1, 111, 40, 110, 119, 113, 117,
DIGS. 1-4; 188/349, 181 C, 181 R, 181 T;
364/426.01

[56] References Cited

U.S. PATENT DOCUMENTS

| | | |
|---|---|---|
| 3,602,553 | 8/1971 | Cumming et al. ............ 303/118 X |
| 3,707,313 | 12/1972 | Michellone et al. ............ 303/100 X |
| 3,758,167 | 9/1973 | Machek ........................... 303/118 X |
| 3,769,533 | 10/1973 | Pauwels ..................... 188/181 R X |
| 3,847,446 | 11/1974 | Scharlack ............................... 303/7 |
| 3,920,283 | 11/1975 | Strader ............................... 303/100 |
| 3,942,845 | 3/1976 | Levering ..................... 188/181 TX |
| 4,071,282 | 1/1978 | Callahan et al. ............. 188/181 CX |
| 4,093,316 | 6/1978 | Reinecke .................. 303/DIG. 4 X |
| 4,130,323 | 12/1978 | Rajput et al. ......................... 303/106 |
| 4,134,621 | 1/1979 | Smedley et al. ........................ 303/96 |
| 4,374,421 | 2/1983 | Leiber ............................... 303/96 X |
| 4,460,220 | 7/1984 | Petersen ........................... 303/111 X |
| 4,715,664 | 12/1987 | Nakanishi et al. .................. 303/111 |
| 4,724,935 | 2/1988 | Roper et al. .................... 303/110 X |
| 4,740,041 | 4/1988 | Pannbacker .................... 303/110 X |
| 4,787,683 | 11/1988 | Singleton ........................ 303/108 X |

OTHER PUBLICATIONS

Eaton Corporation, Publication EA-140, "Eaton Axles and Brakes", 1985.

Primary Examiner—Douglas C. Butler
Attorney, Agent, or Firm—H. D. Gordon

[57] ABSTRACT

In an anti-lock brake control system for a vehicle (1) equipped with tandem axles (3), incipient or actual lockup is sensed on the forward or more lightly loaded axle (10) of the tandem axle pair, which sensing gives early warning of incipient lockup of the rear or more heavily loaded axle (12) of the pair.

4 Claims, 2 Drawing Sheets

TANDEM DRIVE AXLE ANTI-LOCK BRAKE SYSTEM

BACKGROUND OF THE INVENTION

1. Field of the Invention

The present invention relates to anti-lock brake control systems for vehicles having tandem axles and, more particularly, to such a system wherein incipient or actual lockup is sensed on the forward or more lightly loaded axle of the tandem axle pair and the brake pressure and/or rate of increase in brake pressure on the rear or more heavily loaded axle is thereafter reduced or controlled.

2. Description of the Prior Art

Anti-lock brake control systems and devices are well known in the prior art and are exemplified by U.S. Pat. Nos. 3,767,270, 3,768,872, 3,893,696, 3,929,382, 3,929,383, 3,966,267, 4,591,213; 4,724,935 and 4,130,323, the disclosures of all of which are hereby incorporated by reference. Under these systems, incipient or actual skid or wheel lockup is sensed, brake pressure is relieved, and the wheel or wheels are permitted to regain rotational motion prior to reapplication of brake pressure. Maximum vehicle stability together with maximum braking force is obtained by maintaining the longitudinal slip of the braked wheels within predetermined limits. Sensing devices to sense incipient or actual skid or wheel lockup are also well known in the prior art and are exemplified by U.S. Pat. Nos. 3,769,533; 3,854,556; 3,961,214 and 3,980,913, the disclosures of all of which are hereby incorporated by reference.

Anti-lock brake control systems for tandem axles under the prior art typically utilize a sensor for each wheel-end of one or more of the tandem axles, and a brake relief valve for each wheel-end or axle or for all axles; or (2) utilized a sensor on each axle to sense average wheel-end speed and a brake relief valve for that axle or for all axles.

The problem with these systems was their complexity and lack of cost-effectiveness and efficiency. By utilizing multiple sensors and/or brake relief valves, the initial cost of the system was increased, the cost of installation and maintenance was increased, and the likelihood of breakdown was enhanced. Furthermore, these systems failed to make use of the fact that, with most tandem axle suspension systems, the forward axle of the tandem axle pair is more lightly loaded during braking and accordingly will lockup before the rear axle, giving an early warning of incipient lockup of the rear axle. In conjunction with this fact is the fact that the rear axle is more heavily loaded during braking than the forward axle and therefore is more important to control than the forward axle of the tandem axle pair. These same loading conditions are also present when the tandem axle is equipped with a weight transfer system which transfers load from the rear axle to the front axle when the brakes are applied.

SUMMARY OF THE INVENTION

In accordance with the present invention, a more cost-effective and efficient tandem axle anti-lock brake control system is provided. Since with most tandem axle suspension systems the forward axle is the more lightly loaded of the tandem axle pair during braking, the forward axle will lockup before the rear axle of said pair. Accordingly, sensing conditions indicative of actual or incipient lockup of the forward axle will give an early warning of incipient lockup of the rear axle. The term incipient lockup will be used to indicate both actual or incipient lockup conditions.

When incipient or actual lockup of the forward tandem axle is sensed, a signal is sent to a controller, preferably microproessor based, which, in response thereto, will control the braking forces at the rear tandem axle in a predetermined manner. In a preferred embodiment, upon sensing incipient or actual lock-up of the front tandem axle, the controller will reduce the rate of increase in brake pressure on the rear tandem axle. The period of time during which braking force is applied to the rear tandem axle prior to the possible onset of incipient or actual lockup of that axle is thus extended. In an alternate embodiment, only the front, and not the rear, tandem axle is provided with a speed sensor.

The advantage of the present invention lies in the fact that earlier warning of incipient lockup of the rear axle, the axle which is more important to control, is provided. Other methods either do not provide early warning (waiting instead for sensed incipient or actual lockup of the rear axle before brake pressure is relieved or modulated) or provide early warning through more costly and/or less effective means.

Secondly, the present invention takes advantage of the fact that with most tandem axle suspension systems, including all those equipped with unloading devices of the type described above, the rear axle of the tandem axle pair is more heavily loaded during braking than the forward axle and accordingly is capable of providing more braking force than the forward axle. Therefore, under the present invention, a sensor is placed on the forward axle, while the brake relief valve controlled in response to signals from that sensor is placed on the rear axle. Preferably, the rear tandem axle is also equipped with its own sensor means, which provides signals for controlling the brake relief valve after the early warning signal has been sent from the sensor on the forward axle. Efficiencies over prior designs are thus achieved. Only one additional sensor or set of sensors and one brake relief valve or set of valves are required. With fewer parts, costs are reduced and reliability is enhanced. Efficiency is increased, since initial sensing is done on the axle where lockup will first occur, while brake relief occurs on the axle which is capable of providing more braking force and is proportionately more important to control.

Tandem drive axles and suspensions therefor are well known in the prior art and may be seen by reference to U.S. Pat. Nos. 4,050,534; 4,256,327 and 3,534,976, the disclosures of which are hereby incorporated by reference.

Accordingly, it is an object of the present invention to provide an improved tandem axle anti-lock brake system.

A further object of the present invention is to provide a tandem axle anti-lock brake system where an additional sensor is placed on the tandem axle where lockup will first occur and where early warning of incipient lockup of the more heavily loaded tandem axle can be detected, and the brake relief valve means is placed on the more heavily loaded tandem axle which is proportionately more important to control.

These and other objects and advantages of the present invention will become apparent from a reading of the detailed description of the preferred embodiment taken in connection with the attached drawings.

DETAILED DESCRIPTION OF THE PREFERRED EMBODIMENT

Figure 1:
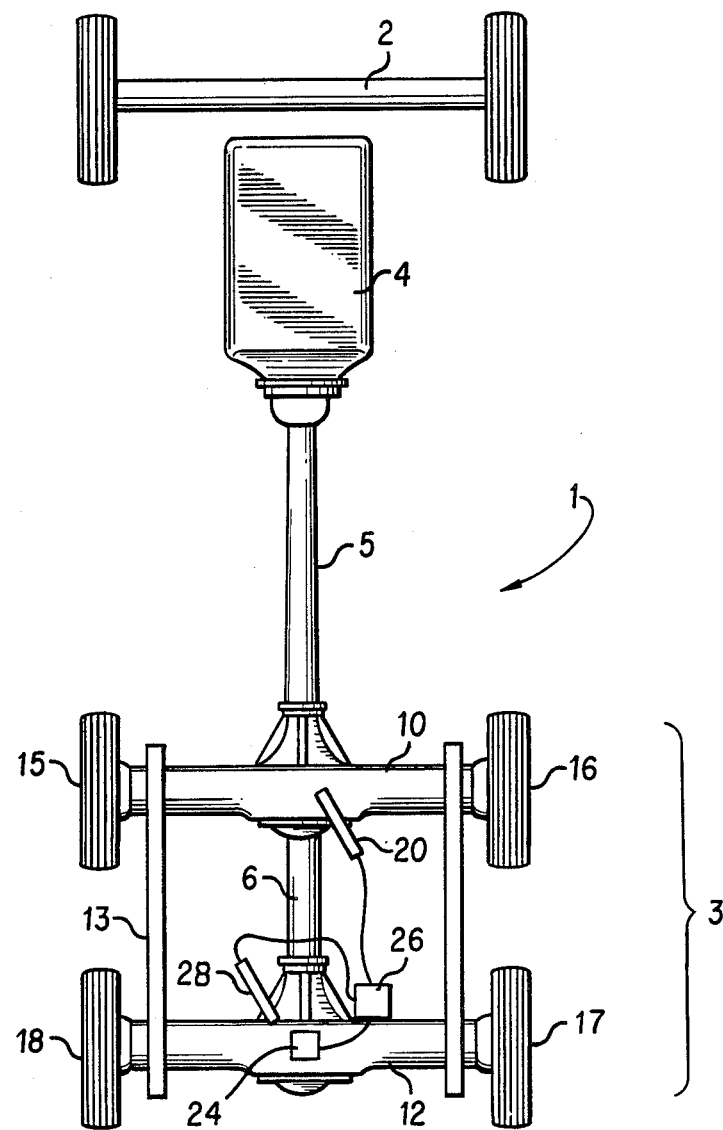
FIG. 1 is a schematic drawing of an anti-lock braking system for a tandem axle vehicle.

FIG. 1 is a schematic illustration of a tandem axle vehicle and an anti-lock braking system therefor. Vehicle 1, which may be a truck, bus or tractor, includes a front steer axle and a rear tandem axle assembly 3 comprising a front-rear drive axle 10 and a rear-rear drive axle 12, both of which axles are mounted to the vehicle frame by a suspension 13. An engine/transmission assembly 4 drives the rear drive axles 10 and 12 through drive shafts 5 and 6. Wheel-ends 15 and 16 are attached to and driven by the forward tandem axle 10 of the tandem axle pair, while wheel-ends 17 and 18 are attached to and driven by the rear tandem axle or of the tandem axle pair. The suspension system such as a "four spring" suspension, is indicated at 13. A sensor assembly 20 is placed on or near the differential of the forward axle 10. This sensor may be of the type taught by prior art, as incorporated by reference above, and will sense the average speed of wheel-ends 15 and 16, or the individual speeds of those wheel-ends. An example of such a sensor is seen in above-mentioned U.S. Pat. No. 3,769,533. Alternatively, individual speed sensors could be provided at each of the wheel-ends.

Each of the wheel-ends is provided with a fluid actuated brake (not shown), such as an air actuated drum, wedge or disk brake, the actuating force on which is directly related to be braking force exerted thereby.

Rear tandem axle 12 is provided with an anti-lock valve 24, such as illustrated in U.S. Pat. No. 3,758,167, the disclosure of which is hereby incorporated by reference, for controlling the pressure of fluid provided to the brakes for wheel-ends 17 and 18. Alternatively, a pair of valves, one for each wheel-end, may be provided. The valve or valves 24 are controlled by a control unit 26, preferably microprocessor based, which may be mounted to the rear tandem axle 12. Sensor 20 provides input signals to control unit 26.

Rear tandem axle 12 is, preferably, also provided with speed sensing means 28 for providing input signals to controller 26 indicative of the average speed or individual speeds of wheel-ends 17 and 18.

When incipient or actual lockup of the forward axle 10 is sensed, the controller 26 will then send a command signal to the valve 24, modifying the pressure supplied to the brakes in a predetermined manner, such as by reducing the rate of increase in brake pressure or maintaining brake pressure at a constant value or decreasing the brake pressure. Thereafter, in the preferred embodiment, the action of controller 26 will be guided by information received from sensor assembly 28 placed on or near the differential of the rear axle. Sensor assembly 28 may be similar or identical to sensor assembly 20. As a result of the early warning, the period of time during which braking force is applied to the rear axle prior to the possible onset of lockup of that axle is extended.

Figure 2:
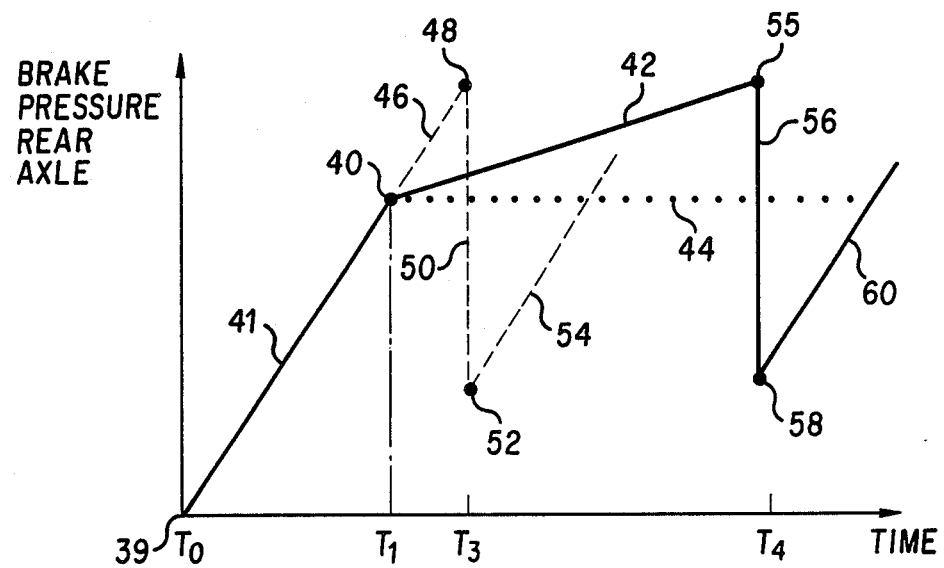
FIG. 2 is a chart plotting brake pressure in the rear tandem axle against time.

With regard to FIG. 2, the section of line 41 between points 39 (Time $T_0$) and 40 relates to the time period, $T_0$-to-$T_1$, after the brake pedal is initially depressed by the driver until the point in time, $T_1$, that sensor assembly 20 provides signals to controller 26 which are indicative of incipient or actual lockup of the forward tandem axle 10. At 40, the controller 26 sends a signal to the brake anti-lock valve 24 modifying rear axle brake pressure in a predetermined manner, such as by reducing the rate of increase of rear axle brake pressure, line 42. But for the action of the controller and brake relief valve, the brake pressure in the rear axle would increase, line 46, until sensor 28 sensed conditions indicative of incipient or actual lockup of the rear tandem axle 12, point 48, and sent a signal to the controller, resulting in decrease of rear axle brake pressure, line 50.

Rear axle brake pressure would thereafter fall in some predetermined fashion until it reached some predetermined level, point 52, at which time brake pressure would again be increased, line 54. This prior art is exemplified by U.S. Pat. Nos. 4,033,635 and 4,724,935, the disclosures of which are hereby incorporated by reference.

Line 42 may or may not rise sufficiently to cause the rear axle to lockup. In either event, the level of brake pressure in the rear axle brakes after point in time $T_1$ will be controlled by information received from sensor 28 in accordance with prior art as referenced above. For example, were rear axle brake pressure to rise sufficiently to cause the rear axle to lockup 58, the brake relief valve would release all or a substantial amount of pressure, line 56, resulting in rear axle brake pressure drop to point 58, followed by rise, line 60, at a first rapid and then a second less rapid rate as is known in the prior art.

As may be seen, by utilizing the input signals from front tandem axle sensor 20, the controller is given an early warning of a possible incipient or actual lockup of the rear tandem axle wheels and will modify the pressure, line 42, applied to the rear tandem axle brakes accordingly. By decreasing the rate of pressure increase, the brakes are maintained from $T_0$-to-$T_4$, rather than from $T_0$-to-$T_3$ as would occur in the absence of the early warning signals from sensor 20.

While in a typical tandem axle suspension 13, such as used in a tractor subvehicle of a tractor-trailer system, the rear tandem axle is usually most heavily loaded during braking conditions, the present invention is equally applicable to tandem axle suspensions wherein the front tandem axle is the most heavily loaded during braking conditions.

The present invention has been described in detail sufficient to enable one skilled in the art to practice same. Upon a reading and understanding of the description of the preferred embodiment, certain modifications, rearrangements and/or alterations of the invention will become apparent to those skilled in the art, and it is intended that the invention include all such modifications, rearrangements and/or alterations, insofar as they come within the scope of the following claims.

I claim:

1. A method for controlling the brake system on a vehicle with a tandem drive axle assembly (3), said tandem drive axle assembly comprising a first drive axle (10) and a second drive axle (12) mounted on the vehicle by a common suspension system (13) including at least one member attached to both of said drive axles and movable relative to said vehicle, said suspension system effective during braking to cause a predetermined one of said first and second drive axles to be more heavily loaded and the other of said first and second drive axles to be more lightly loaded, said method comprising the steps of:

(a) sensing incipient lockup on only the more lightly loaded drive axle of the tandem drive axle assembly; and
(b) when incipient lockup on the more lightly loaded drive axle is sensed, reducing the rate of increase in brake pressure on the more heavily loaded drive axle of the tandem drive axle assembly.

2. An anti-lock brake system for a vehicular tandem drive axle assembly (3) comprising a first drive axle (10) and a second drive axle (12), said drive axles mounted to a vehicle by a common suspension system effective during vehicular braking to cause a predetermined one of said first and second drive axles to be more heavily loaded and the other of said first and second drive axles to be more lightly loaded, said common suspension including at least one member attached to both of said drive axles and movable relative to said vehicle, said anti-lock brake system characterized by:

first sensor means for sensing a value indicative of the rotational speed of the wheel-ends of said other drive axle and for generating first signals indicative thereof;

control means (24) for controlling the braking force applied by the brakes associated with said one drive axle;

processing means (26) for receiving input signals, including said first signals from said first sensor means, and for processing same in accordance with predetermined logic rules to issue command output signals to said control means, said processing means, upon receiving signals indicative of incipient lockup of only the wheel-ends associated with said other drive axle, effective to issue command output signals to said control means to cause a reduction in the rate of increase of braking force applied by brakes associated with said one drive axle.

3. The anti-lock braking system of claim 2 wherein, said processing means, upon receiving signals indicative of lockup of the wheel-ends associated with said other drive axle, is effective to issue command output signals to said control means to cause a reduction in the braking force applied by brakes associated with said one drive axle.

4. The anti-lock brake system of claim 2 additionally characterized by second sensor means for sensing a value indicative of the rotational speed of the wheel-ends of said one drive axle and for generating second signals indicative thereof, said processing means receiving said second signals from said sensor means and processing same in accordance with said predetermined logic rules.

* * * * *